Patented Apr. 25, 1950

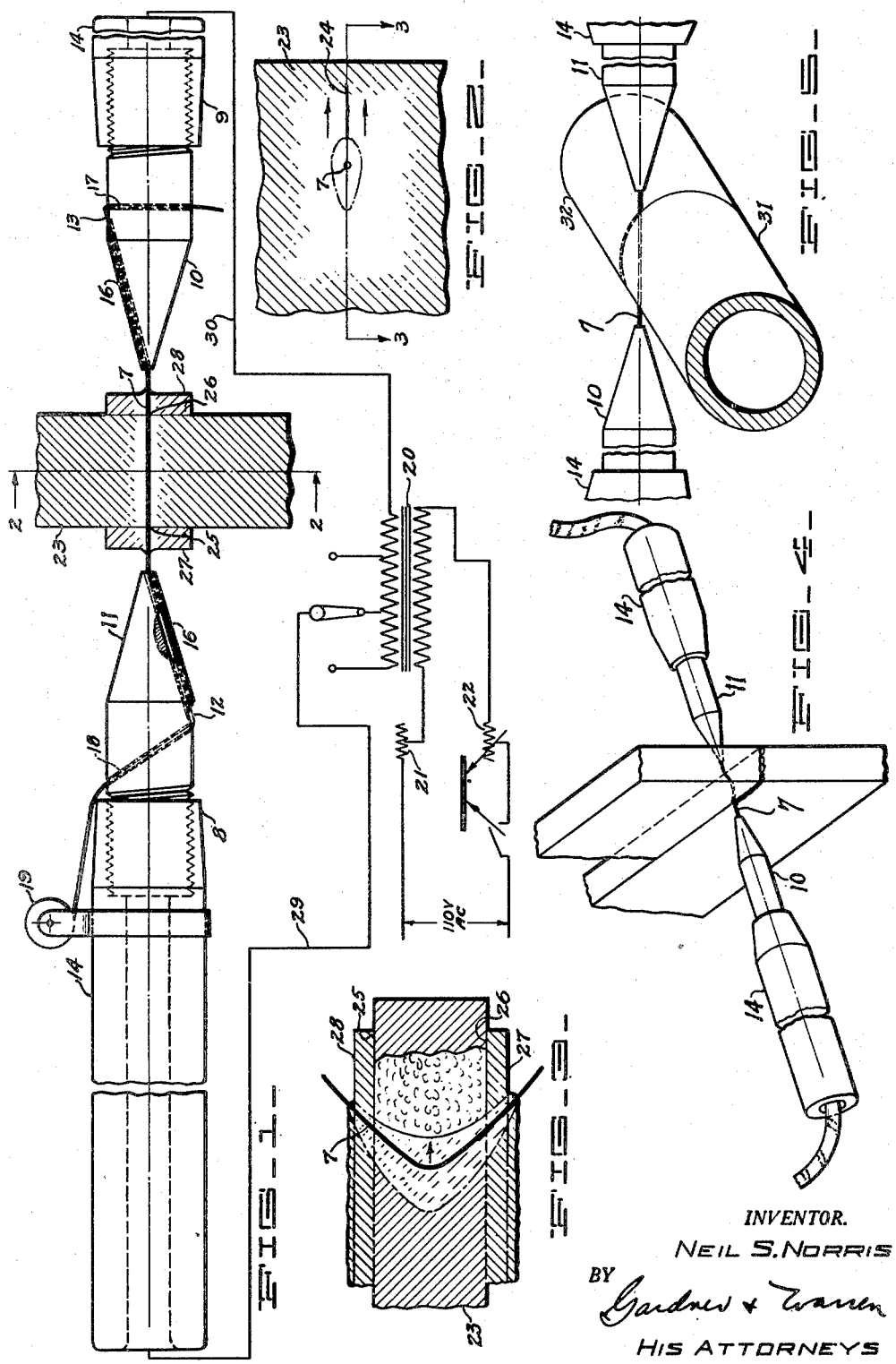

2,505,647

UNITED STATES PATENT OFFICE 2,505,647

PROCESS FOR WELDING THERMOPLASTIC BODIES

Neil S. Norris, Hayward, Calif.

Application June 14, 1944, Serial No. 540,198

5 Claims. (Cl. 154—116)

(Granted under the act of March 3, 1883, as amended April 30, 1928; 370 O. G. 757)

This invention relates to a process of welding a thermoplastic resin and more particularly to a process of uniting contiguous thermoplastic organic resin surfaces with heat alone.

Thermoplastic organic resins as a class are characterized by the property of melting or becoming plastic when heated above a given temperature which varies with particular resins in the class. If the heating is prolonged or excessive temperatures are employed, such resins tend to discolor or partially decompose chemically and are eventually destroyed when heated with sufficient severity. This partial decomposition is particularly damaging to the commercial utility and value of articles made from transparent or light-colored resin bodies where the slightest discoloration is readily apparent.

Thermoplastic organic resins have another property that adds to the difficulties which have been encountered in welding them. These resin bodies are comparatively poor conductors of heat making it difficult to heat the bodies to a uniform temperature through a substantial thickness by usual welding devices without decomposing or discoloring a portion of the body. Further, when welded over an extensive area or thickness, relatively high temperature differentials may exist by reason of their poor heat conductivity. This in turn can lead to uneven cooling and the development of internal stresses and strains upon solidification of the fused or melted resin. Such internal stresses produce distortion, cracking, crazing and the like.

An object of the invention is to provide a method of and apparatus for uniting a thermoplastic resin body to another body in a relatively stress free weld in which all portions of the bond are uniform.

Another object of the invention is to provide a method of and apparatus for welding a transparent or light-colored thermoplastic organic resin body either to join separate members or to repair a crack in a single member without substantial impairment of transparency or material discoloration therof.

A further object is to provide a method and apparatus of the character described which will afford an effective weld between confronting surfaces to be united without requiring said surfaces to be in uniform or absolute contact and without the need of an extraneous weld material where the surfaces may be out of such contact.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1 is a vertical transverse section taken through the contiguous faces of thermoplastic organic resin bodies in the zone of welding.

Figure 2 is a transverse longitudinal section along line 2—2 of Figure 1.

Figure 3 is a horizontal section on line 3—3 of Figure 2.

Figure 4 illustrates an edge to edge welding operation.

Figure 5 shows my method applied to the welding of two sections of tubing or pipe formed of a thermoplastic organic resin.

Resin bodies to which my method of this invention may be applied are preferably of the synthetic linear polymer type exemplified by the vinyl and allied resins. However, the invention does not preclude natural thermoplastic resins, such as shellac and the like, or cyclized polymers illustrated by the coumarone indene resins.

I have found that my invention is especially effective in the welding of a shaped body of transparent or light-colored thermoplastic organic resins such as polymerized methyl methacrylate. Other examples of transparent resins to which the invention may be applied comprise cellulose esters, polystyrene, and vinylchloride-vinyl acetate copolymers. Copolymers of vinylidene chloride, such as translucent vinylidene chloride-vinyl chloride copolymer, likewise may be welded by the process of this invention.

Briefly described, my invention provides an improved method and apparatus for welding opposed confronting surfaces of thermoplastic organic resin bodies, which preferably comprises positioning a hot filament between the confronting portions to form a pencil of heat extending from one side edge of said portion to the other side edge thereof, advancing said filament along the course defined by said portions and while in full contact with both portions for the full width of the confronting area while maintaining said filament at a temperature which will fuse but not chemically alter the resin of each portion immediately adjacent the filament, and moving the filament at a speed which will cause the melted resin from opposing portions to flow and fuse together immediately behind the advancing filament.

The invention as above explained is utilized to weld opposed confronting surfaces forming an interface or confronting area. As will be understood at least one of said surfaces is a thermoplastic organic resin or the like and the other surface may be of any suitable material to which such resin will adhere, e. g. metal, wood, or resin. The invention will be described as applied to opposed surfaces which are both composed of organic thermoplastic resin of the same composition. As an initial step in the method of my invention, a pencil of heat, preferably in the form of a hot filament or wire is inserted between the confronting portions to produce a relatively narrow zone of heat extending from one side edge of the confronting area to the other side edge thereof. The heat of the pencil is transferred uniformly to the resin surface in a narrow confined portion and the amount of heat which penetrates the resin surface is regulated so that only a thin layer of the resin immediately adjacent the heat pencil is melted or substantially softened. Temperature in the heating zone is controlled to raise said adjacent portions of the resin to welding temperature but preferably below the point at which substantial alteration of the chemical nature of the resin would occur. A thin elongated zone of melt extending the width of the confronting portions is thus formed. With heat transfer and temperature maintained as above set forth, the hot filament is advanced, preferably in a substantially continuous manner and at a uniform rate, along the course defined by the confronting portions and while in full contact with both portions for the full width thereof. As the filament is moved forward progressive small areas of said confronting portions are melted and are subjected to a wiping or rubbing force by the contacting filament. This force displaces and crowds the fluid resin of said surfaces into intimate contact, produces a thorough fusion of the surfaces in the zone of melt, and causes the melted resin to run together at the rear side of the advancing filament. It thus will be seen that a complete fusion and weld will be effected along the path traversed by the filament.

The filament is adapted to be advanced along its course at a speed which, with the temperature and heat transfer maintained as above set forth, will cause the melted resin to flow around and immediately behind the advancing filament to leave the confronting surfaces in a fused and united condition. It will be understood that the speed with which the filament is advanced will vary with different resins; however, the filament is generally moved approximately as the area being traversed is melted and the opposed portions fused together. Due to the fact that the filament leaves the fused material while the latter is in a molten state and sufficiently fluid to assume a strain free condition, the fused area solidifies in a corresponding condition.

The foregoing process is continued until the filament is advanced through the entire length of the confronting area whereupon the filament is withdrawn while the resin at the point of termination is still in a molten condition.

In some instances I find that the resin bodies may be burned, distorted or disfigured at the side edges of the confronting area by the heating action of the filament. As an important feature of the invention I arrange to minimize such distortion and do so by utilizing a filament having a hotter center portion within the confronting area and relatively cooler portions at and immediately beyond each side edge of said area. The hotter center portion of the filament insures adequate fusion of the surfaces while the lower temperature of the filament at said side edges reduces the objectionable burning or distortion. As another important feature I also arrange to diminish or prevent any tendency of the resin surface to decompose or discolor along the side edges of the confronting area by excluding atmospheric oxygen therefrom. This is accomplished by sealing said edges from the atmosphere with a sheet or strip of thermoplastic resin, preferably of the same composition as the resin bodies being welded.

I have found that my welding method may be carried out in a very effective manner by employing an electrically heated resistance element in the form of a thin metal filament or wire which I arrange to insert and advance between the portions to be welded. In providing for an effective weld, the confronting surfaces of said portions should be spaced a distance substantially less than the diameter of the filament in order that said filament may fully contact both confronting portions for the full width thereof. Also, the heating filament should have a diameter sufficiently small to cause the melted resin to flow together quickly behind the filament so that the hot filament may be advanced at a speed which will give a satisfactory welding rate. In general, a diameter of from about 0.005 of an inch to about 0.020 of an inch has been found suitable.

In the drawings, I have illustrated a form of apparatus which has been found suitable for carrying on the process of the invention. As here shown, the filament which is numbered 7, is arranged to be supported in a pair of holders 8 and 9 having metal heads or terminals 10 and 11 respectively through which portions 12 and 13 of the filament are threaded. The heads are secured to handles 14 of insulating material and are preferably formed with a conical end from which the filament extends. Hard steel lined bores 16 are provided in each head for the reception of the filament and in the case of head 10, a transverse bore 17 is formed therein at a sharp angle to the bore 16 so that the filament will be firmly held in position. In the case of head 11, angular bores 18 are provided and through which the filament is extended, the bores 18 and 16 permitting ready adjustable positioning of the filament when required. If desired a spool 19 may be provided on the handle for the head 11, on which the free end portion of the filament may be conveniently wound. As will be clear the filament is arranged to be supported with a center portion exposed between the adjacent ends of the heads, and in order to maintain the filament relatively cool at the portion disposed to lie without the confronting areas of the bodies to be welded, the heads or terminals 10 and 11 are formed with relatively large exposed surfaces to facilitate said cooling, and thereby dissipate heat away from said filament and reduce the temperature thereof at the side edges of the confronting areas to minimize objectionable burning and distortion. The filament 7 through the heads or terminals 10 and 11 is connected to a suitable source of electrical energy through the secondary winding of a transformer 20 having variable resistances 21 and 22 (one of which is desirably foot controlled) connected in series with the primary winding for regulating the temperature in the heating zone.

Figures 1, 2 and 3 of the drawing illustrate one mode of applying the principles of my invention and show a shaped body 23 of a thermoplastic resin such as polymerized methyl methacrylate. Within the body 23 as here shown, is a crack 24 defined by confronting or contiguous surfaces of the thermoplastic body and reaching from one side edge 25 to the other side edge 26 of the confronting area. The contiguous surfaces of crack 24 are arranged to be welded by controlled heating of only small successive portions of the confronting area. Heat is applied to the resin surfaces in the foregoing manner by means of the filament 7. The latter is advanced, preferably approximately as fast as fusion and welding occur, and temperature in the heating zone desirably is controlled with the variable resistances so that progressive narrow portions of the resin surfaces are heated to welding temperature but below the decomposition point of the resin. After welding the entire length of the opposed surfaces, the filament is disengaged from one of the terminals and quickly pulled from the resin body before it solidifies at the point. Under some circumstances, in order to provide a more effective weld, the welding operation may be repeated by again traversing the course originally taken by the hot filament.

In the process utilized for welding thermoplastic body 23 of Figures 1 to 3, I exclude atmospheric oxygen from the side edges of the confronting area. To accomplish this result said side edges are temporarily covered with shielding strips 27 and 28 preferably of polymerized methyl methacrylate. During the welding operation, the hot filament 7 passes through the strips 27 and 28 and melts a narrow zone thereof immediately adjacent the crack at its edges and forms a seal which excludes atmospheric oxygen. Any possible oxidation or decomposition by the atmosphere is thereby inhibited or prevented. After the weld is completed, the strips 27 and 28 are easily lifted from the resin body. Any slight roughness along the weld may be removed by lightly buffing or polishing the surface.

Filament 7 may be of any suitable metal. For welding polymerized methyl methacrylate I have found a high carbon steel, such as used in piano wire is satisfactory. The thickness or diameter of the heating element should be sufficiently small to allow the fused resin to flow together behind said element at a satisfactory rate as previously explained.

A few simple tests suffice to determine a suitable size and composition for filament 7. For example, I find that steel piano wire of about 0.10 inch diameter is preferable for welding polymerized methyl methacrylate. Somewhat larger or smaller diameters have been found permissible, for instance, from about 0.008 inch to about 0.015 inch. When using a 0.010 inch steel piano wire filament I connect the same to the secondary of transformer 20 yielding 7.5 volts from 110 volts A. C. applied to the primary. The temperature of the filament is controlled with a 500 ohm 10 watt foot controlled variable resistance 21 and a 350 ohm 10 watt variable resistance 22 both connected in series with the transformer primary winding. Heads 10 and 11 are connected to the secondary of transformer 20 by leads 29 and 30.

One of the important applications of the present invention is the welding or fusing of cracks which frequently form in spheroidal or other three dimensional sheets of transparent thermoplastic material, as used for windshields, turret tops, bomber noses, etc., on aircraft. In such cases, the crack is usually confined to an intermediate portion of the sheet. To expedite insertion of the filament 7, a fine hole is preferably drilled or otherwise provided at one end of the crack. The filament is inserted through the hole, attached at its opposite ends to its heads 10 and 11, the current turned on to bring the wire up to welding temperature and the filament advanced over the length of the crack hereinabove set forth. It will be noted that because of the flexible nature of the filament and of the complete adaptability of the whole assembly, the operator may readily advance the filament to follow the irregularities in the course of the crack, and the curvilinear shape of the sheet.

Figure 4 illustrates the application of my method to the butt welding of thermoplastic resin bodies, preferably of like composition. The process is essentially the same as above described in connection with the welding of the structure shown in Figures 1 to 3.

Figure 5 exemplifies the welding of two sections 31 and 32 of a tube or pipe composed of a thermoplastic organic resin such as polymerized methyl methacrylate. In effecting this weld, I prefer to fill the tube with an inert fluid to prevent burning of the middle section of the hot filament as it extends through the center of the tube from one wall to the other. For example, the tube sections may be placed in the position indicated in the drawing. One of the outer normally open ends is closed and solid carbon dioxide introduced into the tube and placed near the closed end to evaporate or sublime and displace the air in the tube. The remaining open end is next closed to prevent re-entry of air and welding effected with the hot filament as previously described.

Although reference has been made to prevention of decomposition of the thermoplastic resin by my welding method, it is to be understood that my invention in its broader aspects is not limited thereto. Some resin bodies are inherently less heat stable than others and my invention can be applied thereto with advantage even though some decomposition or discoloration may occur. This particularly is true of resins which initially have a dark color or in the case of welding operations where strength and freedom from internal stresses and strains are more important than appearance.

The invention described herein may be manufactured and used by or for the Government of the United States of America for governmental purposes without the payment of any royalties thereon or therefor.

I claim:

1. In a method of uniting bodies at opposed confronting portions, at least one of said portions comprising a thermoplastic material, the steps of passing a hot filament between said confronting portions and along the course defined thereby while in contact with both of said portions for the full width of the confronting area, controlling the temperature of said filament to heat the material adjacent the filament to melting temperature, disposing a fusible member against said portion along said course, thereby to shield the melted resin from atmospheric oxygen at the side edges of the confronting area, and causing the melted resin to flow in behind the advancing filament and fuse with the opposed confronting portion.

2. The method of welding a thermoplastic body to a second body, which comprises confronting said bodies; disposing a fusible strip along an edge of the confronting areas of said bodies, thereby to exclude atmospheric oxygen; advancing a hot filament between said bodies in contact with the confronting area of said thermoplastic body and through said strip, thereby to fuse the thermoplastic; and flowing the melted thermoplastic in behind the advancing filament to weld said bodies together.

3. The method of welding a thermoplastic body to a second body, which comprises confronting said bodies, disposing fusible strips along opposite edges of the confronting areas of said bodies, thereby to exclude atmospheric oxygen; advancing a hot filament between said bodies in contact with the confronting area of said thermoplastic body and through said strips, thereby to fuse the thermoplastic; and flowing the melted thermoplastic in behind the advancing filament to weld said bodies together.

4. The method of welding a thermoplastic body to a second body, which comprises confronting said bodies; disposing a fusible thermoplastic strip along an edge of the confronting areas of said bodies, thereby to exclude atmospheric oxygen; advancing a hot filament between said bodies in contact with the confronting area of said thermoplastic body and through said strip, thereby to fuse the thermoplastic; and flowing the melted thermoplastic in behind the advancing filament to weld said bodies together.

5. The method of welding a thermoplastic body to a second body, which comprises confronting said bodies; disposing fusible thermoplastic strips along opposite edges of the confronting areas of said bodies, thereby to exclude atmospheric oxygen; advancing a hot filament between said bodies in contact with the confronting area of said thermoplastic body and through said strips, thereby to fuse the thermoplastic; and flowing the melted thermoplastic in behind the advancing filament to weld said bodies together.

NEIL S. NORRIS.

REFERENCES CITED

The following references are of record in the file of this patent:

UNITED STATES PATENTS

| Number | Name | Date |
|---|---|---|
| 127,270 | Robinson | May 28, 1872 |
| 168,801 | Stevens | Oct. 11, 1875 |
| 1,026,456 | Rambaud | May 14, 1912 |
| 1,564,637 | Snyder | Dec. 8, 1925 |
| 1,660,855 | Bainbridge | Feb. 28, 1928 |
| 2,130,948 | Carothers | Sept. 20, 1938 |
| 2,343,106 | Carney | Feb. 29, 1944 |
| 2,360,950 | Kilgour | Oct. 24, 1944 |